United States Patent [19]

Glucina

[11] Patent Number: 5,247,231
[45] Date of Patent: Sep. 21, 1993

[54] METHODS OF AND/OR APPARATUS FOR BRAKING AN ELECTRONICALLY COMMUTATED MOTOR AND/OR LAUNDRY MACHINES INCORPORATING THE SAME

[75] Inventor: Anthony P. Glucina, Auckland, New Zealand

[73] Assignee: Fisher & Paykel Limited, Auckland, New Zealand

[21] Appl. No.: 810,397

[22] Filed: Dec. 19, 1991

[30] Foreign Application Priority Data

Dec. 19, 1990 [NZ] New Zealand ................ 236541

[51] Int. Cl.⁵ .................... H02P 3/12; H02P 6/02
[52] U.S. Cl. ............................ 318/380; 318/254
[58] Field of Search ............ 318/138, 254, 375, 376, 318/377, 378, 379, 380, 439

[56] References Cited

U.S. PATENT DOCUMENTS

| | | | |
|---|---|---|---|
| 3,628,110 | 12/1971 | Casaday | 318/138 |
| 3,792,329 | 2/1974 | Kuhnlein | 318/373 X |
| 4,278,921 | 7/1981 | Medding et al. | 318/254 |
| 4,426,606 | 1/1984 | Suita et al. | 318/375 |
| 4,431,956 | 2/1984 | Angquist | 318/759 |

*Primary Examiner*—Bentsu Ro
*Attorney, Agent, or Firm*—Trexler, Bushnell, Giangiorgi & Blackstone, Ltd.

[57] ABSTRACT

A method of braking an electronically commutated motor (ECM) by connecting a braking resistor across the motor supply rails and controlling the commutation sequences of the motor. The commutation switching devices are controlled to commutate power generated in said windings by rotation of the motor rotor to the power supply ratio. The power commutated to the supply rails is dissipated in the braking resistance to brake the motor.

32 Claims, 5 Drawing Sheets

METHODS OF AND/OR APPARATUS FOR BRAKING AN ELECTRONICALLY COMMUTATED MOTOR AND/OR LAUNDRY MACHINES INCORPORATING THE SAME

This invention relates to methods of and/or apparatus for braking an electronically commutated motor and/or laundry machines incorporating the same.

It is an object of the present invention to provide methods of and/or apparatus for braking an electronically commutated motor and/or laundry machines incorporating the same, which will at least provide the public with a useful choice.

Accordingly in one aspect the invention may be said to consist in a method of braking an electronically commutated motor (ECM) having a stator including energisable windings and a rotor, and using a power supply having an upper and a lower voltage rail, commutating circuitry, commutation control means controlling at least one switching device for each said winding to selectively connect said windings between said rails, and a braking switch for connecting a braking resistance between said rails, when braking is desired, said method comprising the steps of connecting said braking resistance between said rails and controlling the commutation sequences of said motor by controlling connection of the windings of the motor to said rails by said at least one switching device for each winding in a commutation sequence so that currents flowing in said braking resistance due to back EMF's generated in said windings due to kinetic energy in the rotating rotor are augmented by controlling the phase relationship between the back EMF's and the EMF's applied by said commutating circuitry.

In a further aspect the invention may be said to consist in a method of braking a spin tub and agitator assembly of a laundry machine driven by an ECM having a stator and a rotor said spin tub and said agitator being fixed to said rotor, at least while in a spin mode, said method being effected in accordance with the methods of braking said ECM as claimed in the preceding paragraph.

In a still further aspect of the invention consists in braking apparatus for braking an electronically commutated motor (ECM) having energisable windings and a rotor said apparatus comprising a power supply means for supplying power to an upper and a lower voltage rail, commutation circuitry and commutation control means, at least one switching device for each winding of said ECM, said at least one switching device being controlled by said commutation control means and commutation circuitry for selectively connecting said windings between said upper and lower rails, a braking switch, a braking resistance switchable by said braking switch to be connected between said voltage rails, said commutation control means controlling the commutation of said motor by controlling connection of the windings of the motor to said rails through appropriate said at least one switching device for each winding so that when said braking resistance is connected between said rails, said commutation control means control the commutation sequences of said motor by controlling connection of the windings of the motor to said rails by said at least one switching device for each winding in a commutation sequence so that currents flowing in said braking resistance due to back EMF's generated in said windings due to kinetic energy in the rotating rotor are augmented by controlling the phase relationship between the back EMF's and the EMF's applied by said commutating circuitry.

In a still further aspect the invention may be said to consist in a laundry machine having a cabinet, a water container within said cabinet, a spin tub within said container, an agitator within said spin tub and connected so as to be rotated back and forth by an ECM and to be rotated with said spin tub when driven continuously in one direction, said ECM having a stator with energisable windings and a rotor said agitator and said spin tub being fixed, at least during a spin cycle to said rotor and having braking apparatus as claimed in the preceding paragraph.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

Figure 1:
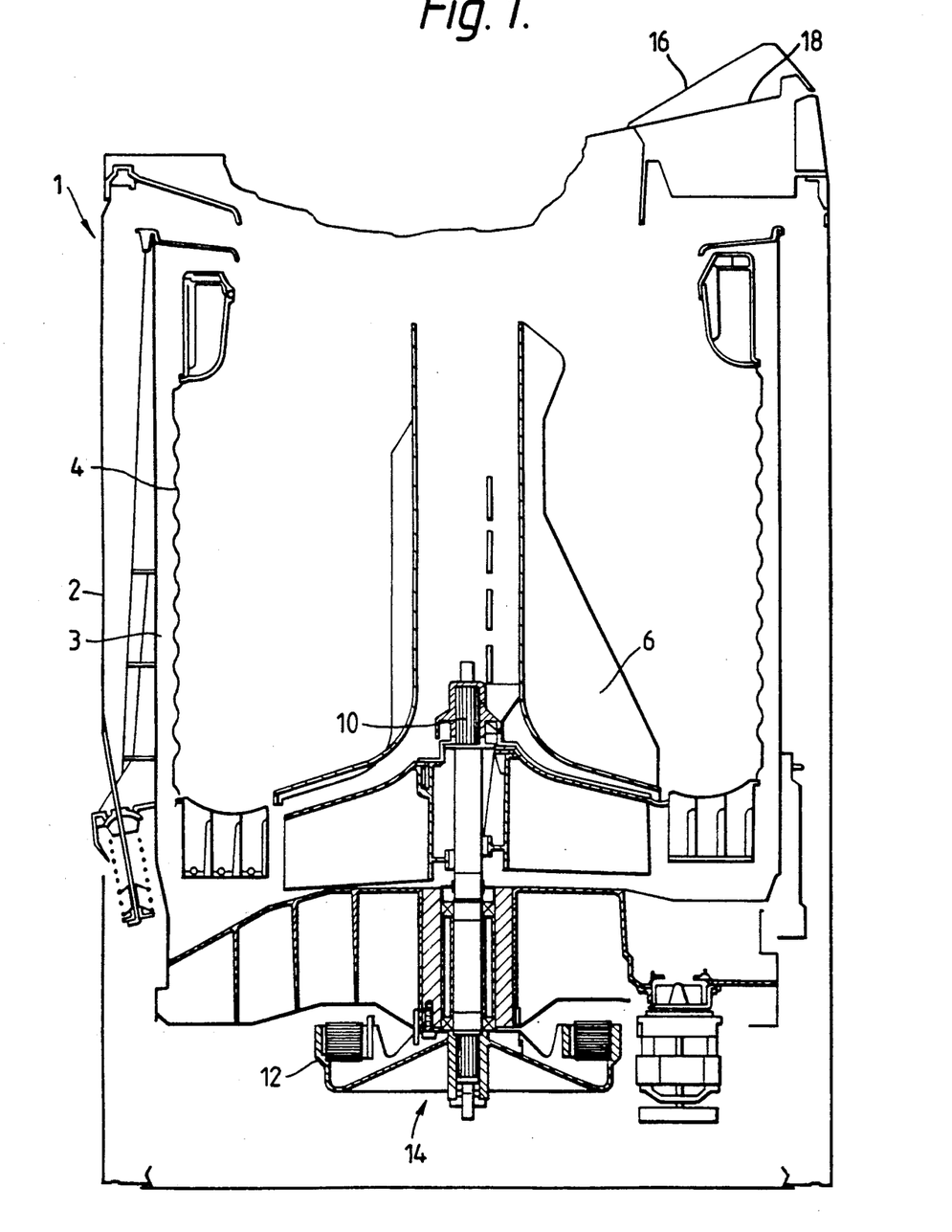
FIG. 1 is a side elevation of a laundry machine shown in cross section.

Referring to the drawings, FIG. 1 shows a laundry machine 1 having an outer casing 2 and a container 3 which in use contains washing liquid usually water in which clothes are to be laundered. Mounted within the container 3 is a spin tub 4 and mounted within the spin tub is an agitator 6. The agitator is mounted on and driven by a shaft 10 which is connected to the rotor 12 of an electric motor 14. The laundry machine also has an operating console 16 and adjacent the console 16 is a microprocessor and associated electronic circuitry comprising control means 18 for controlling the operation of the laundry machine such a laundry machine is described in for example U.S. Pat. No. 4,835,839. The control means 18 include PWM circuitry as is referred to in U.S. Pat. No. 4,857,814.

Figure 2:
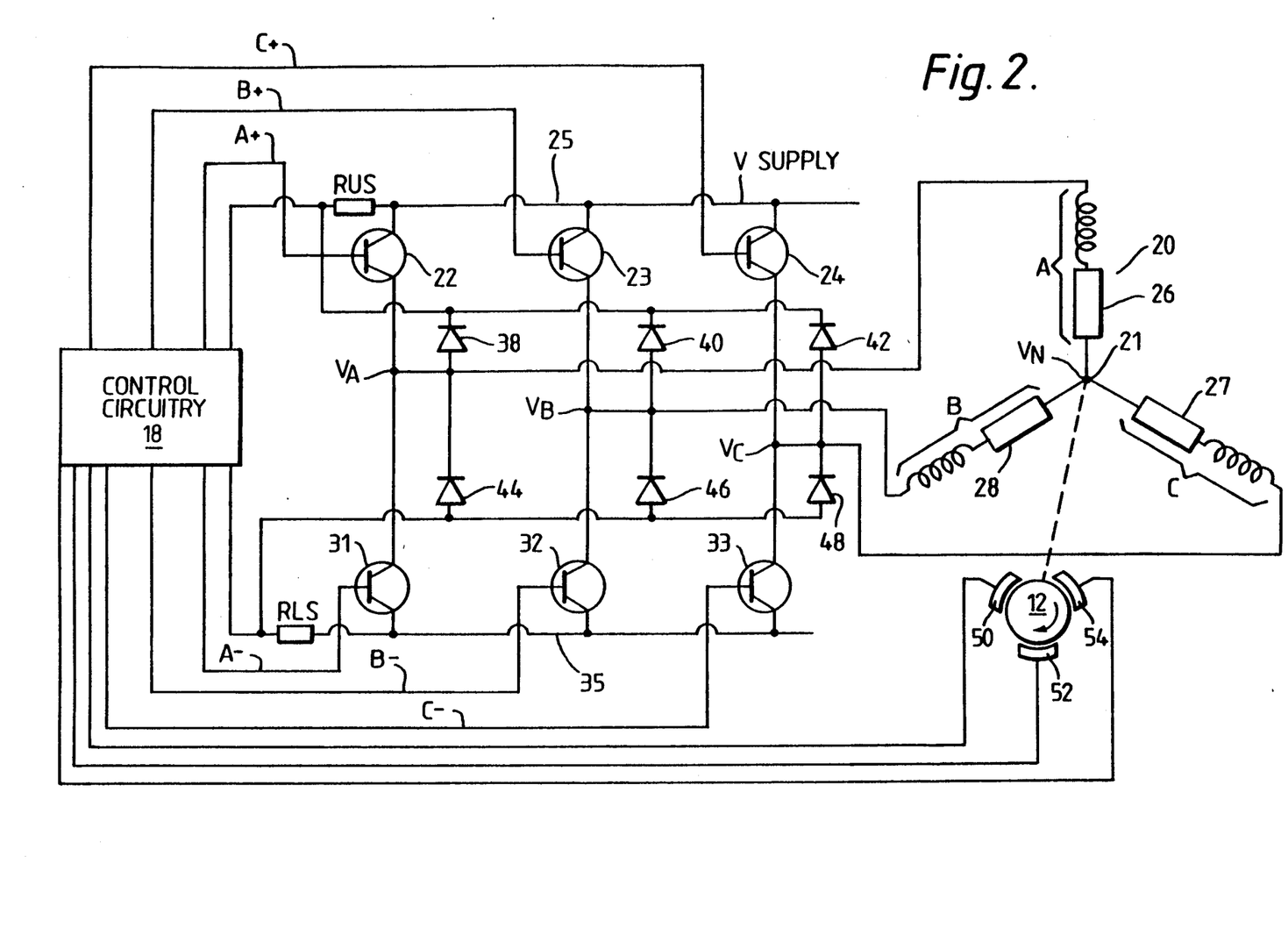
FIG. 2 is a circuit diagram of the switching and control circuitry for an electronically commutated motor used in accordance with the present invention.

The electric motor 14 is an electronically commutated motor (ECM) and the commutation switches and control are shown in more detail in FIG. 2. The rotor of the ECM is a permanent magnet rotor, as described in the aforementioned U.S. Patent Specification.

Thus referring to FIG. 2 there is provided an ECM 14 having three windings or phases A, B and C with a common point 21 and a switching bridge in which three switching devices 22, 23 and 24, which are e.g. IGT's or FET's, connect the supply positive rail 25 (V supply) from a full wave rectified mains power supply to the windings 26, 27 and 28. Three further switches 31, 32 and 33 connect the ends of the windings to the power supply negative rail 35, the six switches being in a totem pole configuration. The six switches may also be protected by known snubbing circuits (not shown). The upper switches 22, 23 and 24 may be referred to as the A+, B+ and C+ switches and the lower switches 31, 32 and 33 may be referred to as the A−, B− and C− switches. Free wheel diodes 38, 40, 42, 44, 46, and 48 allow currents induced in the windings to be returned to the supply rails in the known way. Connected in series with rail 35 is a lower sense resistor RLS and connected in series with the V Supply rail is an upper sense resistor RUS. Resistors RLS and RUS which are of low value e.g. 0.1 ohm are used for current control as is explained later.

Motor 14 is commutated using pulse width modulation (PWM) methods and the operation of motor 14 is more fully described in U.S. Pat. No. 4,857,814, the disclosure of which is incorporated herein by reference.

Instead of sensing the back EMF induced in the windings to sense rotor position as disclosed in U.S. Pat. No. 4,857,814, the present invention uses Hall Effect sensors 50, 52 and 54 (FIG. 2) which provide signals to the control circuitry 18 which are indicative of rotor position. Information from the specification of U.S. Pat. No. 4,857,814 relating to operating as a motor is as follows:

"To cause the rotor 12 of motor 14 to rotate in a clockwise direction, voltages are applied to the windings from rails 25 and 35 and assuming that winding 26 is A, winding 27 is C and winding 28 is B and that if we wish to have power on the motor at zero degrees such that we have a maximum EMF across the motor and thus maximum Torque in the clockwise direction, switches 22 (A+) and 33 (C−) would be switched on, connecting power from the positive rail 25 through switch 22 to the A phase windings 20 through the neutral point 21 and the C phase windings 27 through switch 33 to negative rail 35. Thus to obtain maximum Torque in the motor the connections would be A+ and C− to the 60° angle and then B+ and C− to the 120° angle then B+ and A− to 180° angle then C+ and A− to the 240° angle, C+, B− to the 300° angle, A+ and B− to the 360° angle, the sequence commencing at A+ and C− again. Thus there is a sequence of six different patterns and each goes to 60° angle of rotation giving a total of 360° in rotation."

Figure 3:
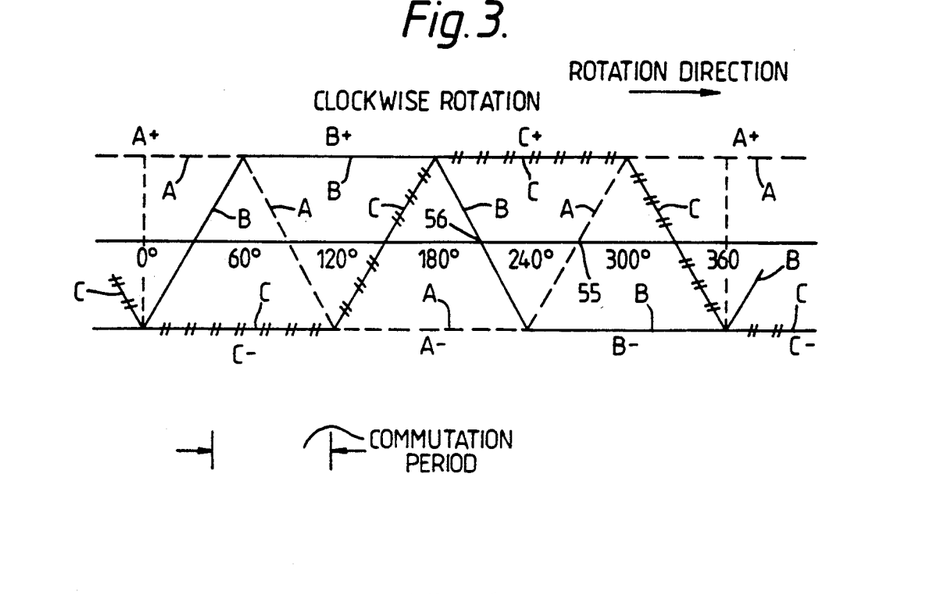
FIG. 3 is a diagram of Electromotive Forces (EMF's) induced in the windings of a three phase electronically commutated motor for a single electrical rotation of the rotor in degrees, when the rotor is rotated in the clockwise direction.

Looking now at operating the motor 20 as a generator i.e. without power being applied to the windings, if the rotor of the motor is rotated in the clockwise direction and voltage measurements are taken at the ends of the windings 26, 27 and 28 with respect to the star point 21 i.e. the centre of the three phase windings, EMF's will be generated and in FIG. 3 such EMF's have been plotted. The figure illustrates a single electrical revolution of the rotor in electrical degrees with zero degrees chosen arbitrarily and essentially shows the wave forms of a three phase generator with the exception that the wave forms instead of being sinusoidal are trapezoidal. The voltages induced in the three windings have been indicated in FIG. 3 by the letters A (pecked line), B (full line) and C (slashed line). For example in B winding it will be seen that in FIG. 3 the EMF goes from a maximum negative at zero degrees through zero voltage to a maximum positive, stays at a maximum positive for 120° then goes from maximum positive through zero voltage to maximum negative, stays at maximum negative for 120° and then starts to rise again from 360 degrees.

When the ECM is operating under steady state conditions under power its internal operating characteristics approximate those of a synchronous motor and the back EMF's are generated as above outlined in relation to operating only as a generator.

Figure 4:
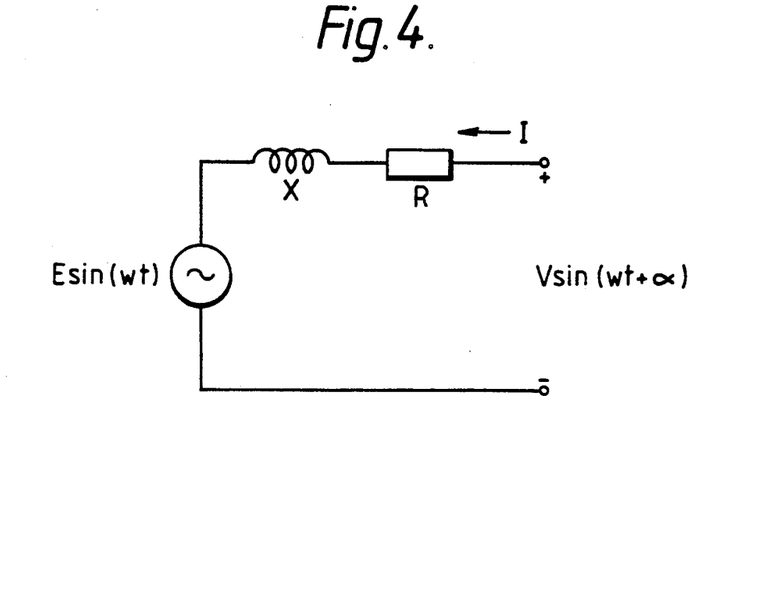
FIG. 4 is a circuit diagram of an equivalent circuit for a synchronous machine.
Figure 5:
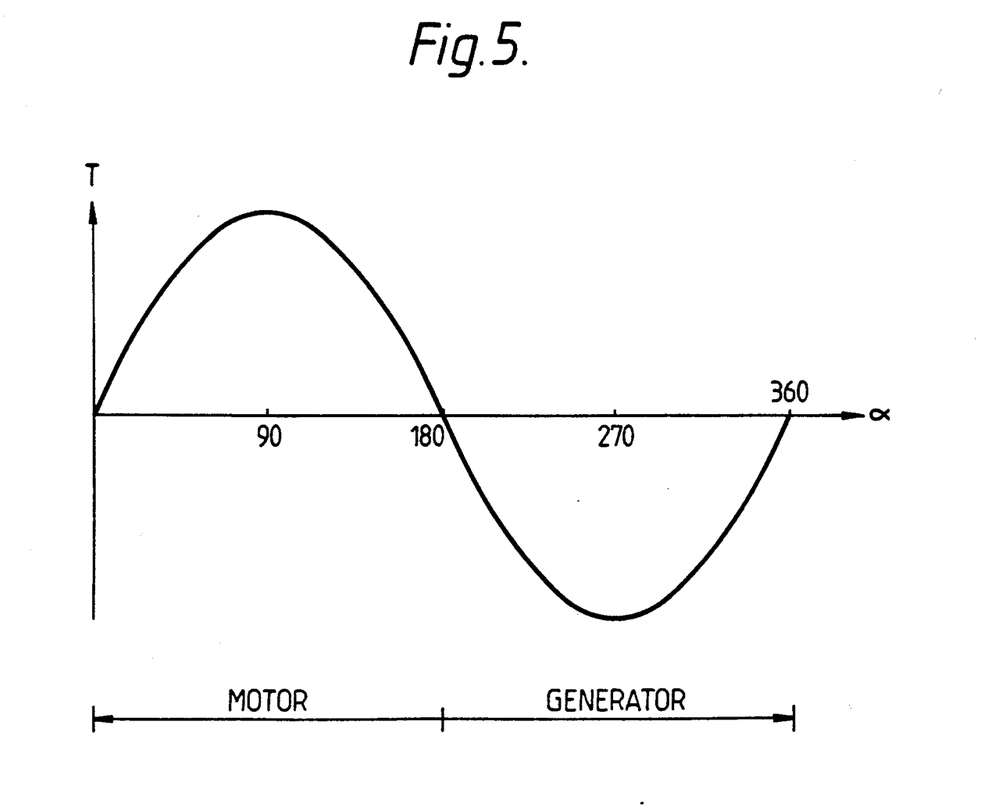
FIG. 5 is a graph of torque vs commutation phase angle for a synchronous machine.

Referring to FIG. 4, an equivalent circuit for a synchronous machine operating as a motor is shown in which the voltage applied to the stator terminal windings is represented by $V \sin(wt + \alpha)$ and the back EMF induced in the windings is shown as $E \sin(wt)$. The resistance of the windings is represented by resistor R and the reactive component of the overall winding impedance is represented by inductance X. Although the diagram of FIG. 4 assumes that the applied and induced voltages and currents flowing through the windings are sinusoidal, the ECM of the present invention when operating at speed as a synchronous machine will very closely approximate the equivalent circuit shown in FIG. 4. Commutation of the machine establishes a phase relationship between the currents flowing in said windings and the EMF's induced therein. In FIG. 4, it is assumed that the voltage applied to the windings leads the back EMF by an angle $\alpha$ which is representative of the phase angle between the interacting magnetic fields in the machine i.e. the principal axis of the field of the stator winding being commutated and the principal axis of the appropriate rotor field and therefore determines the torque produced by the motor. Referring to FIG. 5, when the angle $\alpha$ is between 0° and 180° electrical, a positive torque is produced and as $\alpha$ increases from 0° to 90° the torque also increases to a maximum at 90° and then decreases between 90° and 180°. If the applied voltage across the winding terminals lead the back EMF by more than 180° electrical then negative torque is produced and the motor acts as a generator. The negative torque increases if $\alpha$ is between 180° and 270° and decreases between 270° and 360°. If $\alpha$ is made sufficiently large so that the voltage applied to the motor windings leads the back EMF by 180° to 360°, then the motor may also be made to act as a generator so the motor may be effectively braked. When acting as a generator the back EMF is being commutated to the motor power supply, so a high supply voltage will enhance the negative torque produced, enhancing the braking effect.

Since the motor windings are spaced 120° apart, the Hall Effect sensors, 50, 52 and 54 supply signals of the rotor position which is in turn indicative of the EMF induced in the windings by rotation of the rotor, at each interval of 60° electrical of rotation of the rotor. This allows the position of the rotor to be known as described in the aforementioned U.S. Pat. No. 4,857,814 in which digitised signals of induced voltages in the windings were used instead of Hall effect sensors. Since the position of the rotor is known at every 60° electrical of rotation, the control circuitry is programmed to effect switching of the switching devices to commutate the motor by switching supply voltage between rails 25 and 35 across the windings 90° in advance of the back EMF. Similarly, the control circuitry is programmed to commutate the EMF's applied to the windings 270° in advance of the induced back EMF's in order to provide a braking effect on the rotating rotor. This may be done by monitoring the speed of the motor and from the known speed switching voltage across the windings at a predetermined earlier time in order to effect the advanced phase angle relative to the back EMF's. Thus the motor may be commutated such that the commutated supply voltage leads the EMF by 180°-270° electrical to provide an optimal braking effect other axes of advance may be used.

Figure 6:
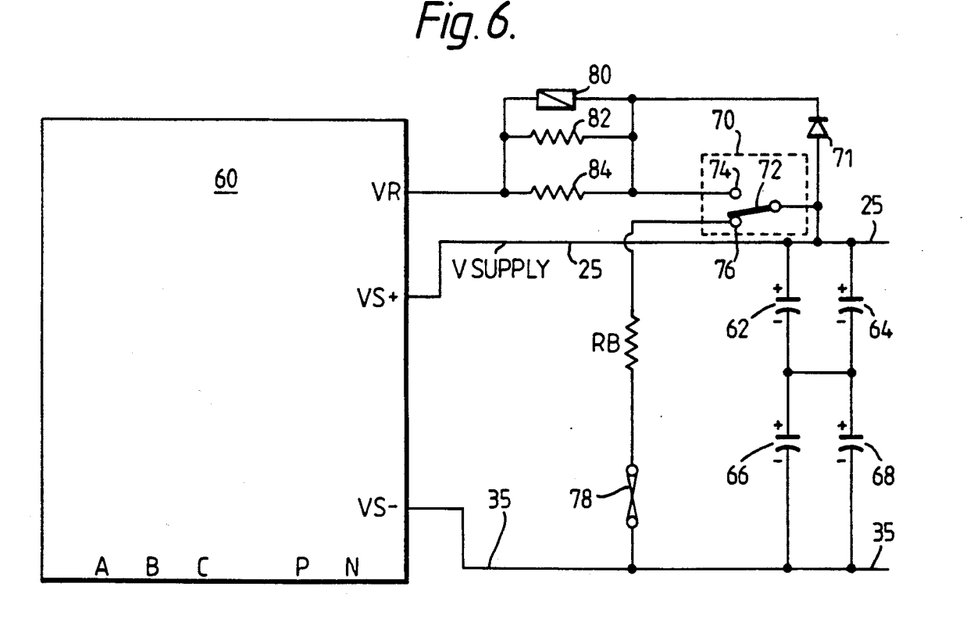
FIG. 6 is a circuit diagram of a part of the control circuitry shown in FIG. 2 and an additional circuit thereto.

Part of control circuitry 18 is shown in more detail in FIG. 6 in which an integrated power module 60 is shown which comprises part of the circuitry of FIG. 2 including the switching devices 22 to 24 and 31 to 33 and associated diodes 38, 40, 42, 44, 46 and 48 (shown in FIG. 2). The integrated power module 60 also includes a full wave rectifier supplied with power from the a.c. mains at e.g. 230 or 120 volts at P & N for supplying the d.c. voltage present between the V supply rail 25 and rail 35 via pin VR. The integrated power module 60 also has output pins A, B and C for connecting points VA, VB and VC respectively to the motor windings. Connected between the V supply rail 25 and rail 35 are four capacitors 62, 64, 66 and 68 which are e.g. 330 µF each and rated at 250 volts and are used to assist filtering the power supply. Also connected to the V supply rail 25 is a relay 70 having a contact 72 which is controlled by the control circuitry 18 to make contact with terminal 74 or terminal 76. Terminal 76 is connected to a braking resistor RB which in turn is connected in series with a fuse 78 to the VS- rail 35. Alternatively the relay contact 72 is controlled by the control means to make electrical contact with terminal 74. The terminal 74 is connected through a network of pull up resistors 80, 82 and 84 to the VR pin on integrated power module 60. A diode 86 is connected across relay 70 between the contact 72 and terminal 74.

Braking of the agitator 6 and spin tub 4 of the laundry machine described with reference to FIG. 1 is necessary for safety reasons, particularly during spin cycles. The present invention provides a method of controlled braking for the above described laundry machine having an electronically commutated motor (ECM) and this method is described below.

When the rotor of the ECM is rotating e.g. when connected to the agitator 6 and spin tub 4 of the laundry machine for spinning, the brake resistor RB is connected across the supply rails 25 and 35 during braking by the control circuitry 18 switching relay contact 72 to the contact 76 (FIG. 6). The voltages applied are the algebraic sum of voltages on rails 25 and 35 and the back EMF's are such as to cause currents to flow in braking resistor RB where energy is dissipated.

Energy stored in the capacitors 62, 64, 66 and 68 is discharged through the brake resistor, so the value of the brake resistor RB determines the peak voltage to which the capacitors 62, 64, 66 and 68 will charge. However the amount of braking achieved is a function of the motor dynamics which include winding inductances, winding resistances, the speed of rotation of the rotor, the back EMF induced in the windings and the commutation phase angle at which commutation of applied EMF's is effected. The amount of braking is also dependent on the size of capacitors 62, 64, 66 and 68. The value of the capacitance of the main rail capacitors 62, 64, 66 and 68 are only of significance when the speeds of rotation of the rotor are very low. A large value of effective capacitance for capacitors 62, 64, 66 and 68 will increase braking performance at low speeds e.g. speeds below 200 rpm for the motor used in accordance with the present invention. The total capacitance of capacitors 62 to 68 (approximately 33 µF) was found to be satisfactory.

Figure 7:
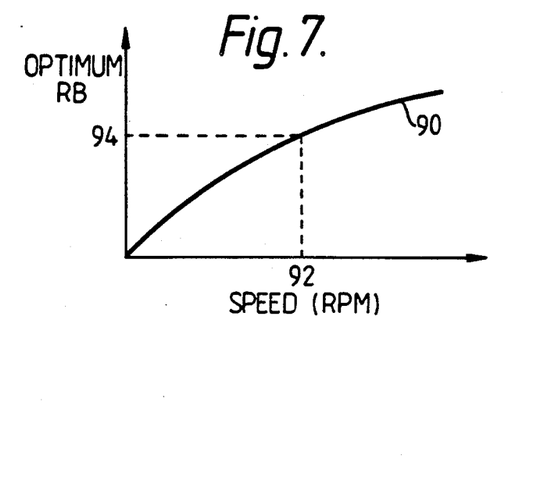
FIG. 7 is a graph of optimum braking resistance RB vs rotational motor speed for an electronically commutated motor.

However selection of the resistance of RB has been found to be of importance in determining braking performance. It has been found that the value of RB will alter braking performance over the whole motor speed range, the optimum value of RB reducing with reducing speed for optimum brake performance. With the present invention a value is chosen for the brake resistor which is a compromise of optimum values for the brake resistor over the speed range of the motor. Referring to FIG. 7 the curve 90 is a plot of optimum RB vs motor speed. A value of RB e.g. 60Ω was chosen (point 94) from a midpoint 92 in the motor speed range.

Figure 8:
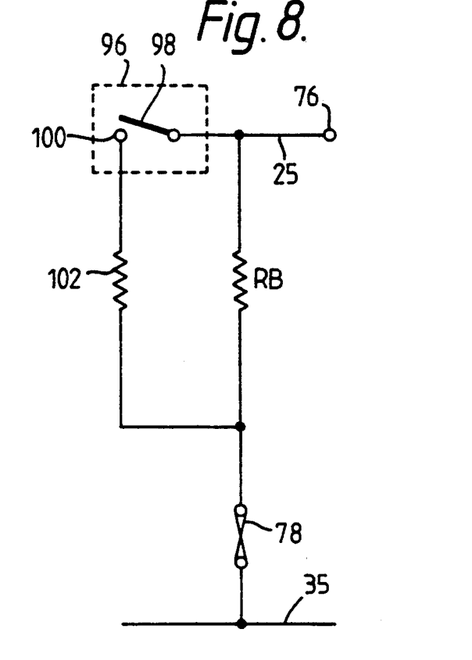
FIG. 8 is a circuit diagram of a part of the circuitry shown in FIG. 6 and an additional circuit thereto.

As an alternative to fixed resistor RB, a transistor could be used as a variable resistor being controlled by the control circuitry dependent on the motor speed or, a negative temperature coefficient (NTC) resistor could be used, so that the resistance of the braking resistor decreases as the motor speed decreases under braking. However, since the brake resistor is required to dissipate high power loads e.g. 5000 to 7000 Joules in approximately 7 seconds, these two forms of variable resistor were found to be expensive to implement. Another means of providing a suitable brake resistor is to provide a plurality of individual resistors each switchable between rails 25 and 35 by a resistor switch means in response to signals from a motor speed sensing means. A further brake resistor is shown in FIG. 8. When resistor switch means comprising relay 96 is switched by the control means 18 to connect contact 98 to terminal 100, a further braking resistor 102 will be connected in parallel with RB to alter the effective braking resistance. The individual resistors, RB and resistor 102, or further resistors, can be switched on individually or in combination depending on motor speed to provide a net braking resistance which approximates the optimal braking resistance for any given motor speed.

As has been described above, when braking the ECM of the present invention the ECM is commutated between 180° and 270° electrical in advance of the EMF induced in the windings in order to produce braking. The selection of the advanced phase angle between these limits will produce different braking effects dependent on the speed of the rotor.

Figure 9:
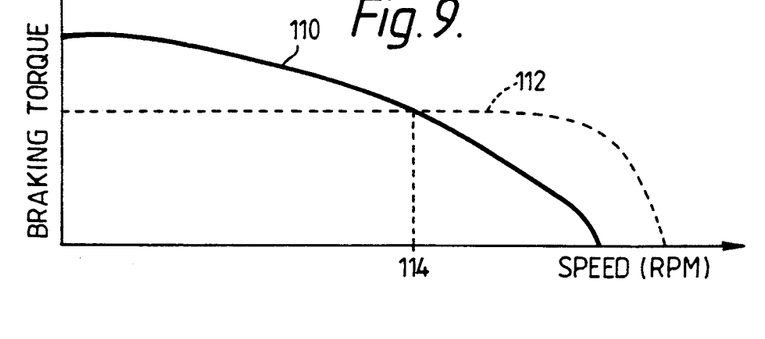
FIG. 9 is a graph of braking Torque vs rotational motor speed for an electronically commutated motor when commutated in different braking commutation patterns.

Referring to FIG. 9 a graph of braking torque vs motor speed is shown. Curve 110 represents commutation of applied EMF's occurring e.g. 240° electrical in advance of the back EMF and curve 112 represents the effect of further advanced commutation angle e.g. 270° electrical in advance of the back EMF. To enhance performance the control means can be programmed to switch at a speed corresponding to point 114 in FIG. 9 between selected advanced commutation angle.

With the circuit shown in FIG. 2 there are motor speeds (depending on the dynamics of the system) where the current in the windings may well exceed the practical limits of the circuit used. Thus a control method is required to limit the current flowing through the switching devices to within practical limits.

This can be achieved by monitoring the current in the upper and lower rails 25 and 35 of the bridge circuit shown in FIG. 2 by the use of sensing resistors RUS and RLS. Current flowing through rails 25 and 35 is seen by the control circuitry as a voltage across the low resistance sensing resistors RLS. When the current in one or other of the supply rails reaches a certain value, then the voltage across the sensing resistor RUS or RLS will also reach a certain value and this value is compared by the control means with a predetermined voltage corresponding to a predetermined current limit. A control technique has been developed using only the lower sense resistor RLS. With this control technique whenever the current limit is reached in the lower supply rail 35 all switching devices which are turned "on" are turned "off" until the beginning of the next PWM cycle. This has been found to produce adequate current control. Although the currents in the upper supply rail ramp up higher than the lower limit, the overshoot is predictable if the dynamics of the system are known. Also, if the values of RB and capacitors 62, 64, 66 and 68 are optimised, then control by this method has been found to be more than adequate. There are two further control methods referred to below under headings A and B, which enable good control of current in the motor and these are described as follows:

A. If an upper current limit is reached in the switching devices connected to the upper V supply rail 25 then this upper current limit is sensed by the control circuitry 18 and all the upper switching devices that are switched "on" at the time are switched "off" until the next PWM period. Also, if an upper current limit is reached in the switching devices connected to the lower rail 35 then all the lower switching devices which are "on" at the time are switched "off".

B. A second method of current control is to turn "off" all devices in the circuit which are switched "on" if either the current in the upper V supply rail 25 or lower rail 35 exceeds the current limit. The devices are left turned "off" until the beginning of the next PWM cycle.

The disadvantage of the two control systems described above is the cost of the circuitry required to sense the current flowing in the upper V Supply rail. To sense the current in this rail a sense resistor RUS is required and this must be a high wattage resistor due to the large currents flowing in the rail and also the means to refer the voltage signal from RUS to the control circuitry is expensive since high voltages relative to the voltage of the lower rail e.g. 400 volts are often present on the upper V Supply rail 25 relative to rail 35.

Since the current flowing through the switching devices 22-24 and 31-33 can be controlled, then in the braking mode, when contact 72 is in the Brake position (FIG. 6), the current flowing through RB can be controlled and thus the amount of braking is also controllable. Therefore by controlling the lower current limit the amount of braking can be controlled.

Figure 10:
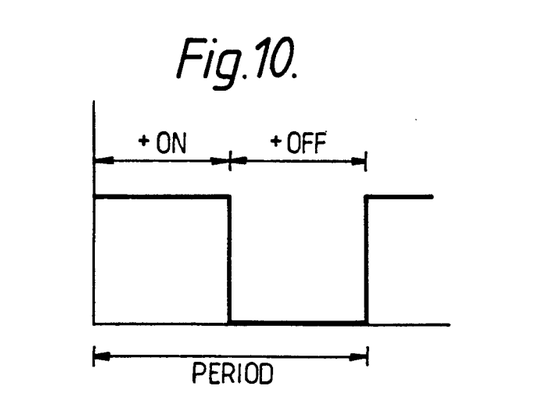
FIG. 10 is a diagram of a pulse width modulated waveform with amplitude on the vertical axis and time on the horizontal axis showning the "on" time and the "off" time for a single period.

The amount of braking has also been found to be controllable by controlling the PWM of the switching devices. A diagram of a PWM cycle is shown in FIG. 10. The Duty Cycle D is calculated as $$D = t\,on/(t\,on + t\,off).$$

During the period "t on" the devices are "on" according to the necessary switching sequence previously described and during the time "t off" all the switching devices are switched "off". By increasing the duty cycle D, braking was found to increase. Thus as the switches are turned on for longer periods in each PWM cycle, more energy is transferred from the rotor to the supply rails 25 and 35 for dissipation in the resistor RB.

Most automatic laundry machines require mechanical movement limiting means e.g. braking straps which limit movement of the container suspension rods relative to the laundry machine during the sudden application of a braking force. However, if the braking force is controlled then it may be applied slowly enough to at least largely eliminate sudden jerks and the requirement for braking straps. Methods used to control the braking of the motor to eliminate sudden undesirable changes in motor speed during braking are described below.

The operation of the equipment during braking is as follows. It will be assumed that braking is to be commenced from full spin speed of the ECM, say 1100 RPM.

Firstly an initial braking force is supplied by switching all the switching devices 22 to 24 and 31 to 33 "off" and switching relay contact 72 (FIG. 6) to contact terminal 76 so that the braking resistor RB is connected between rails 25 and 35. Thus initial passive braking is achieved by initial braking means comprising the free wheel diodes 38, 40, 42, 44, 46 and 48 which commutate current from the windings and this current is dissipated in the braking resistor RB. This mode is maintained for a short period of time e.g. 700 milliseconds and then active braking is begun by switching the devices 22 to 24 and 31 to 33 in a braking mode as previously described. Accordingly, the switching devices are switched in a sequence e.g. 180° to 270° electrical in advance of the back EMF's induced in the windings. The use of applied EMF's effected by the controlled commutation of the switching devices causes increased current flow both in the braking resistance RB to cause increased dissipation of energy and in the windings to cause an increased braking effect on the rotation of the rotor.

Secondly the PWM duty cycle can be gradually increased from 0 to 100% in order to gradually increase the braking torque such that there is no shock loading and braking of the motor is effected smoothly and quickly. This modulated braking technique produces smooth braking so mechanical movement limiting means are unlikely to be necessary in the laundry machine incorporating the present invention under normal operations.

One problem with relying on this method of braking in which the commutation switches are activated in order to bring the motor to a stop is that if power is removed from the washing machine, for example whilst the machine is in a spin mode then the machine could not activate a braking sequence since there would be no power supplied to the control circuit.

Thus the present invention uses the rotational energy of the motor to power the commutation control circuitry when braking is required. Referring to FIGS. 2 and 6 the DC power supply rails 25 and 35 are supplied with power from the back EMF induced in the motor windings and passively commutated to the rails by the free wheel diodes, 38, 40, 42, 44, 46 and 48 so that power is supplied to the rails 25 and 35 when the rotor is rotating, when the external power supply is not present. To brake the motor after the external power supply has been removed, during e.g. a power cut, the braking procedure described above is used. When power is removed from the machine and if the rotor is rotating then free wheel diodes 38, 40, 42, 44, 46 and 48 will commutate current from the windings to the supply rails 25 and 35.

The supply of current to rails 25 and 35 is filtered by power supply capacitors 62, 64, 66 and 68 to provide a substantially DC supply on rails 25 and 35. The control circuitry power supply is derived from rails 25 to 35, so the control circuitry may operate to switch relay contact 72 on to contact 76. The voltage on rail 25 is passed to the switched mode power supply 61 through diodes 71 and 77. The switched mode power supply 61 supplies power to the control circuitry 18 at the appropriate voltage (e.g. 15 V). The presence of rail 25 voltage enables operation of the control circuitry 18, so the required commutation control signals corresponding to the desired braking pattern may be supplied on output pins A, B and C for braking the motor.

From the foregoing it will be seen that a method of effectively braking an electronically commutated motor is provided which allows a controlled amount of braking to be applied smoothly and without physical shock at minimal cost, particularly when applied to the spin tub of a laundry machine which has a considerable amount of kinetic energy to be dissipated if the tub and contents are to be brought to a standstill in a short time for safety reasons. The method of braking described may also be effected when the power supply to the ECM and control circuitry is disconnected.

It will also be seen that a method of braking the rotatable assembly of a laundry machine is also provided whereby braking straps or shock absorbers are unnecessary.

What is claimed is:

1. A method of braking an electronically commutated motor (ECM) having a rotor and a stator including energisable windings, and using a power supply having an upper and a lower voltage rail, commutating circuitry to supply commutating EMF's to said motor, commutation control means controlling at least one switching device for each said winding to selectively connect said windings between said rails, and braking switch for connecting a braking resistance between said rails, when braking is desired, said method comprising the steps of continuing to maintain voltage on said voltage rails and to supply commutating EMF's to said motor connecting said braking resistance between said rails and controlling the commutation sequences of said motor by controlling connection of the windings of the motor to said rails by said at least one switching device for each winding in a commutation sequence so that currents flowing in said braking resistance due to back EMF's generated in said windings and due to kinetic energy in the rotating rotor are augmented by controlling the phase relationship between the generated back EMF's and the commutating EMF's applied by said commutating circuitry.

2. A method as claimed in claim 1 wherein said phase relationship comprises an angular displacement of 180° to 360° electrical between the principal axis of the magnetic field of one of said windings connected between said rails by said at least one switching device and the principal axis of the magnetic field of said rotor.

3. A method as claimed in claim 1 which includes the step of controlling said phase relationship between said commutating EMF's and said back EMF's in said windings so that currents passed to said braking resistance by said back EMF's generated are increased or decreased by controlling said commutation sequences to control said phase relationship.

4. A method as claimed in claim 1 and further includes the step of using the braking resistance having a value of resistance which is to give an acceptable compromise on braking over the speed range of the motor in use.

5. A method as claimed in any one of the claim 1 and further includes the step of using a speed dependent braking resistor as said braking resistance.

6. A method as claimed in any one of claim 1 and further includes the step of using a negative temperature coefficient resistor as said braking resistance.

7. A method as claimed in any one of the claim 1 and further includes the steps of using a plurality of individual braking resistors each connectable between said upper and lower voltage rails, sensing the speed of rotation of said motor with motor speed sensing means, and changing the value of said braking resistance by connecting said individual braking resistors between said rails individually or in combination.

8. A method as claimed in claim 1 and further includes the step of controlling said switching devices using pulse width modulation (PWM) methods such that each said switching device is switched "on" for a predetermined "on" time period and switched "off" for a predetermined "off" time period, said "on" period and said "off" period together defining a modulation time period of a predetermined duration.

9. A method as claimed in claim 8 and further includes the steps of initiating braking by connecting said braking resistance between said rails, controlling said commutating circuitry so that all said switching devices are turned "off" and using a free wheel diode associated with each switching device to pass current to said braking resistance and then, after a period of time, commencing commutation of said switching devices to cause said phase relationship between said commutating EMF's and said back EMF's.

10. A method as claimed in claim 9 and further includes the step of controlling said switching devices after commencement of commutation of said switching devices to increase braking by increasing the duration of said "on" time period relative to said "off" time period in said modulation time period.

11. A method as claimed in claim 8 and further includes the step of controlling the current levels flowing in said windings so that a predetermined current limit is not exceeded.

12. A method as claimed in claim 11 and further includes the steps of controlling said current levels by sensing, by use of current sensing means, the currents flowing in at least one of said upper or lower voltage rails and on the currents reaching or exceeding said predetermined current limit, passing a signal from said current sensing means to said commutating circuitry to cause said switching devices which are "on" to be switched "off" until the commencement of the next modulation period.

13. A method as claimed in claim 12 wherein said lower voltage rail is at a lower voltage than said upper voltage rail and said method includes the step of sensing currents flowing in said lower voltage rail.

14. A method as claimed in claim 12 and further includes the step of controlling currents flowing in said windings by controlling the duration of said "on" period relative to the duration of said "off" period in each said modulation period.

15. A method as claimed in claim 1 and further includes the steps of causing said commutating circuitry and said commutation control means to be supplied with power supplied by the electrical energy generated in said windings during braking of said motor.

16. A method as claimed in claim 1, said method is used for braking a spin tub and agitator assembly of a laundry machine driven by said motor, said spin tub and said agitator assembly being fixed to said rotor, at least while in spin mode.

17. A braking apparatus for braking an electronically commutated motor (ECM) having energisable windings and a rotor, said apparatus comprising a power supply means for supplying power to an upper and a lower voltage rail, commutation circuitry to supply commutating EMF's to said motor, commutation control means, at least one switching device for each winding of said motor, said at least one switching device being controlled by said commutation control means and said commutation circuitry for selectively connecting said windings between said upper and lower rails, a braking switch, a braking resistance switchable by said braking switch to be connected between said voltage rails, said commutation control means controlling the commutation of said motor by controlling connection of the windings of the motor to said rails through appropriate said at least one switching device for each winding so that voltage is maintained on said rails and commuting EMF's are being supplied to said motor and said braking resistance is connected between said rails, said commutation control means controls the commutation sequences of said motor by controlling connection of the windings of the motor to said rails by said at least one switching device for each winding in a commutation sequence so that currents flowing in said braking resistance due to back EMF's generated in said windings and due to kinetic energy in the rotating rotor are augmented by controlling the phase relationship between the generated back EMF's and the commutating EMF's applied by said commutation circuitry.

18. Apparatus as claimed in claim 17 wherein said phase relationship comprises an angular displacement of 180° to 360° between the principal axis of the magnetic field of one of said windings connected between said rails by said at least one switching device and the principal axis of the magnetic field of said rotor.

19. Apparatus as claimed in claim 17 wherein said commutation control means controls said phase relationship between said commutating EMF's and said back EMF's in said windings so that currents passed through said braking resistance are increased or decreased by controlling said commutation sequences to control said phase relationship.

20. Apparatus as claimed in claim 19 wherein the value of said braking resistance is selected to give an acceptable compromise on braking over the speed range of the motor in use.

21. Apparatus as claimed in claim 19 wherein said braking resistance comprises a speed dependent braking resistance.

22. Apparatus as claimed in claim 19 wherein said braking resistance comprises a negative temperature coefficient resistor.

23. Apparatus as claimed in claim 19 wherein said braking resistance comprises a plurality of individual braking resistors each connectable between said upper and lower voltage rails such that said individual braking resistors are connected between said rails individually or in combination dependent on the speed of rotation of said motor to change the value of said braking resistance.

24. Apparatus as claimed in claim 19 wherein said commutation control means includes a pulse width modulation (PWM) control means to control said switching devices using PWM methods such that each said switching device is switched "on" for a predetermined "on" time period and switched "off" for a predetermined "off" time period, said "on" period and said "off" period together defining a modulation time period of a predetermined duration.

25. Apparatus as claimed in claim 24 wherein initial braking means are provided including at least one free wheel diode associated with each said switching device such that braking of said motor is initiated by controlling said commutation circuitry so that all said switching devices are turned "off" and using said free wheel diodes associated with each said switching device to pass current to said braking resistance and, after a period of time, commencing commutation of said switching devices to cause said phase relationship between said commutating EMF's and said back EMF's in said windings.

26. Apparatus as claimed in claim 25 wherein said PWM control means includes duty cycle control means such that after commencement of commutation of said switching devices, increased braking is effected by increasing the duration of said "on" time period relative to said "off" time period in said modulation period.

27. Apparatus as claimed in claim 24 wherein said commutation control means includes current control means to control the currents flowing in said windings so that a predetermined current limit is not exceeded.

28. Apparatus as claimed in claim 27 wherein said current control means include current sensing means to sense the currents flowing in at least one of said upper or lower voltage rails such that when the currents reach or exceed said predetermined limit, said current sensing means passes a signal to said commutation circuitry to cause said switching devices which are "on" to be switched "off" until the commencement of the next modulation period.

29. Apparatus as claimed in claim 28 wherein said lower voltage rail is at a lower voltage than said upper voltage rail and said current sensing means sense currents flowing in said lower voltage rail only.

30. Apparatus as claimed in claim 28 wherein said current control means control currents flowing in said windings by controlling the duration of said "on" period relative to the duration of said "off" period in each said modulation period.

31. Apparatus as claimed in claim 19 wherein said commutation circuitry and said commutation control means are supplied with power supplied by the electrical energy generated in said windings during braking of said motor.

32. Apparatus as claimed in claim 19 which is used in a laundry machine having a cabinet, a water container within said cabinet, a spin tub within said container, an agitator within said spin tub and connected so as to be rotated back and forth by said motor and to be rotated with said spin tub when driven continuously in one direction, said agitator and said spin tub being fixed, at least during a spin cycle, to said rotor.

* * * * *

UNITED STATES PATENT AND TRADEMARK OFFICE
CERTIFICATE OF CORRECTION

PATENT NO. : 5,247,231
DATED : September 21, 1993
INVENTOR(S) : Anthony P. Glucina It is certified that error appears in the above-indentified patent and that said Letters Patent is hereby corrected as shown below:

Column 2, Line 54 " showning " should be — showing —
Column 10, Line 11 " in any one of the claim 1 " should read
— in claim 1 —
Column 10, Line 14 " in any one of claim 1 " should read
— in claim 1 —
Column 10. Line 17 " in any one of claim 1 " should read
— in claim 1 —

Signed and Sealed this

Seventeenth Day of May, 1994

Attest:

BRUCE LEHMAN

Attesting Officer        Commissioner of Patents and Trademarks